Dec. 2, 1924.                            1,517,442
A. S. LOMSHAKOFF
GAS ANALYZING APPARATUS
Filed Dec. 12, 1923        3 Sheets-Sheet 1
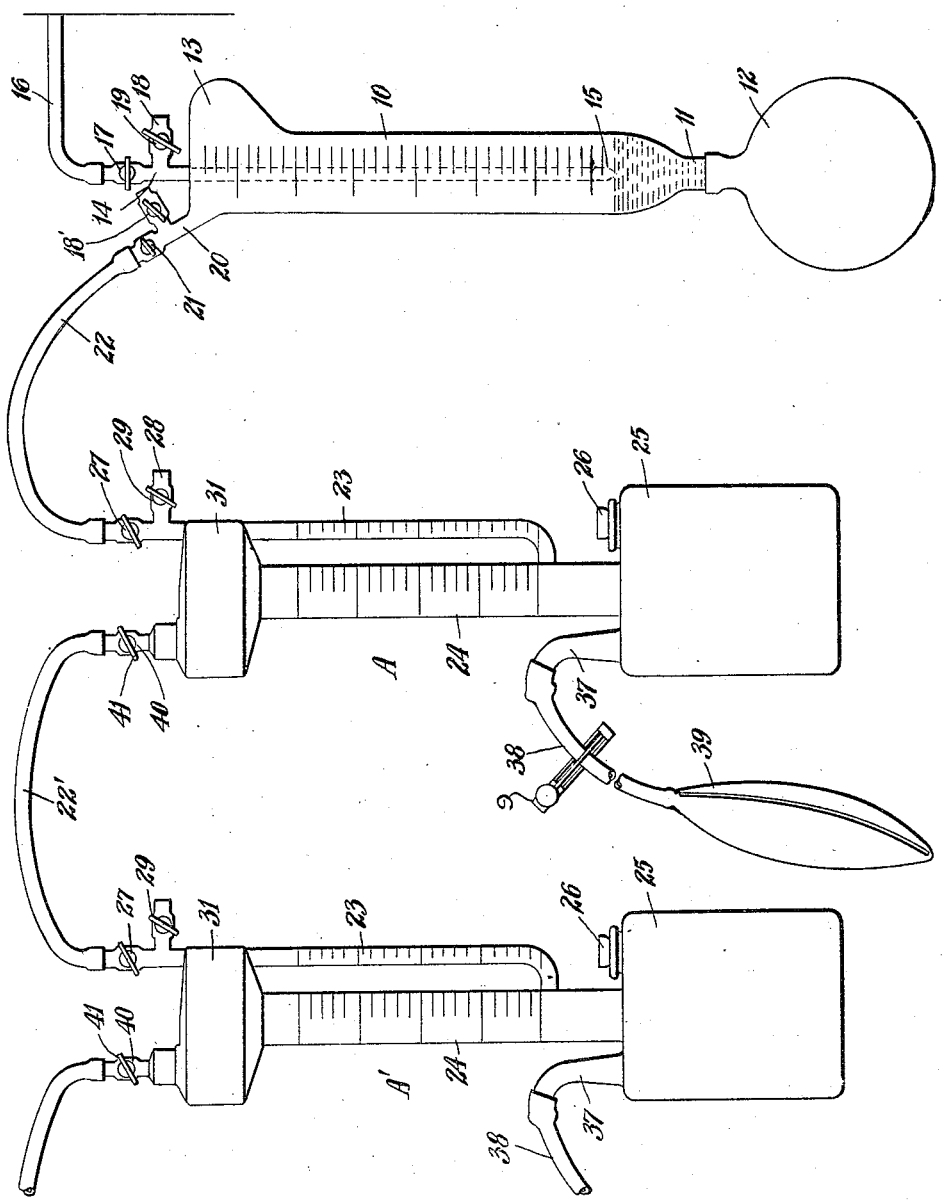

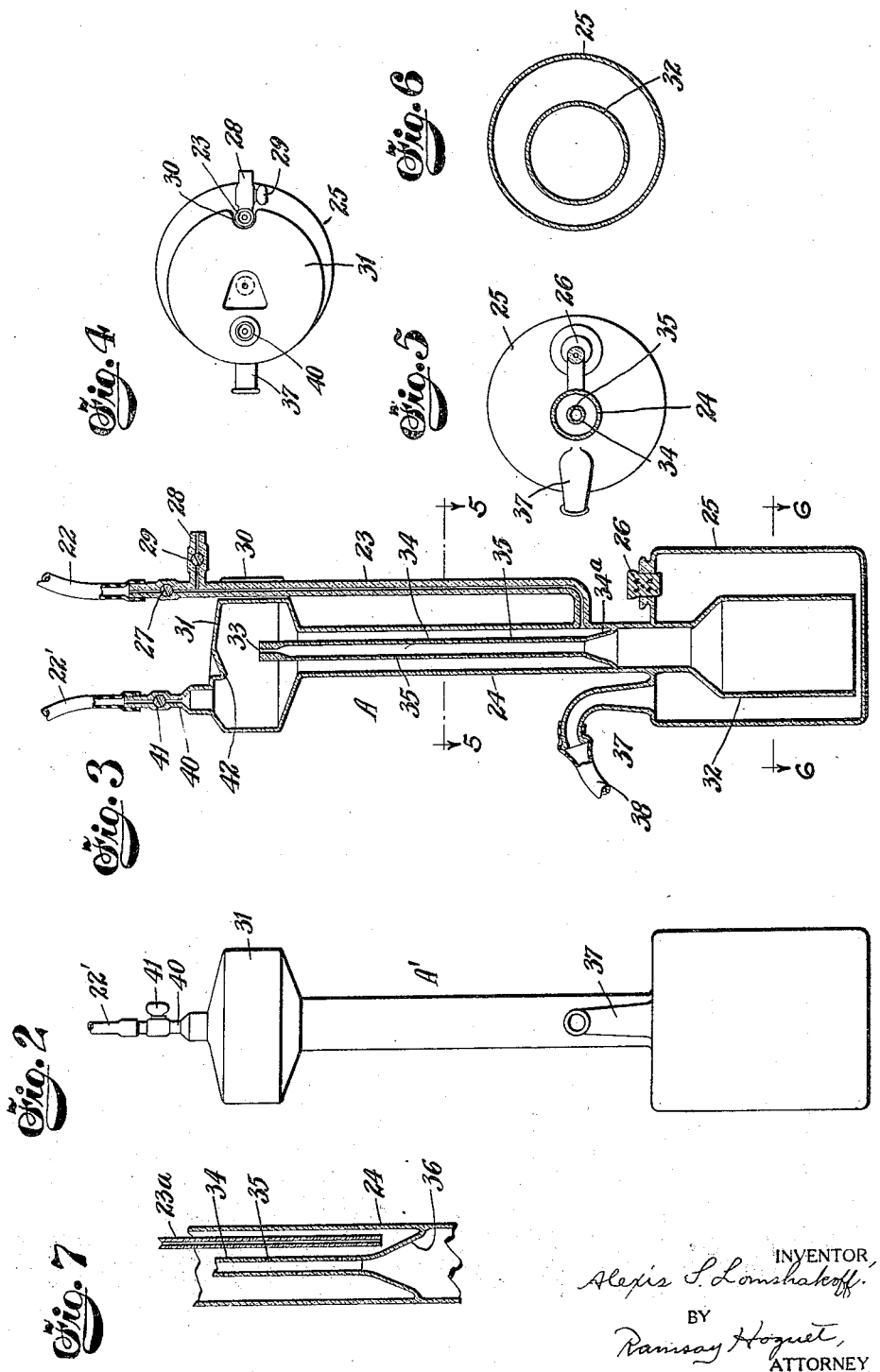

Dec. 2, 1924.
A. S. LOMSHAKOFF
1,517,442
GAS ANALYZING APPARATUS
Filed Dec. 12, 1923   3 Sheets-Sheet 3
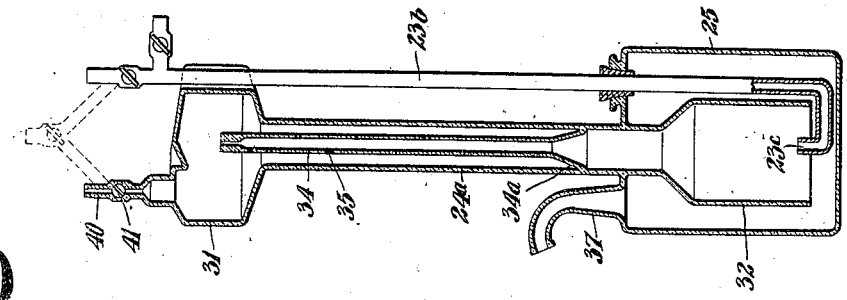
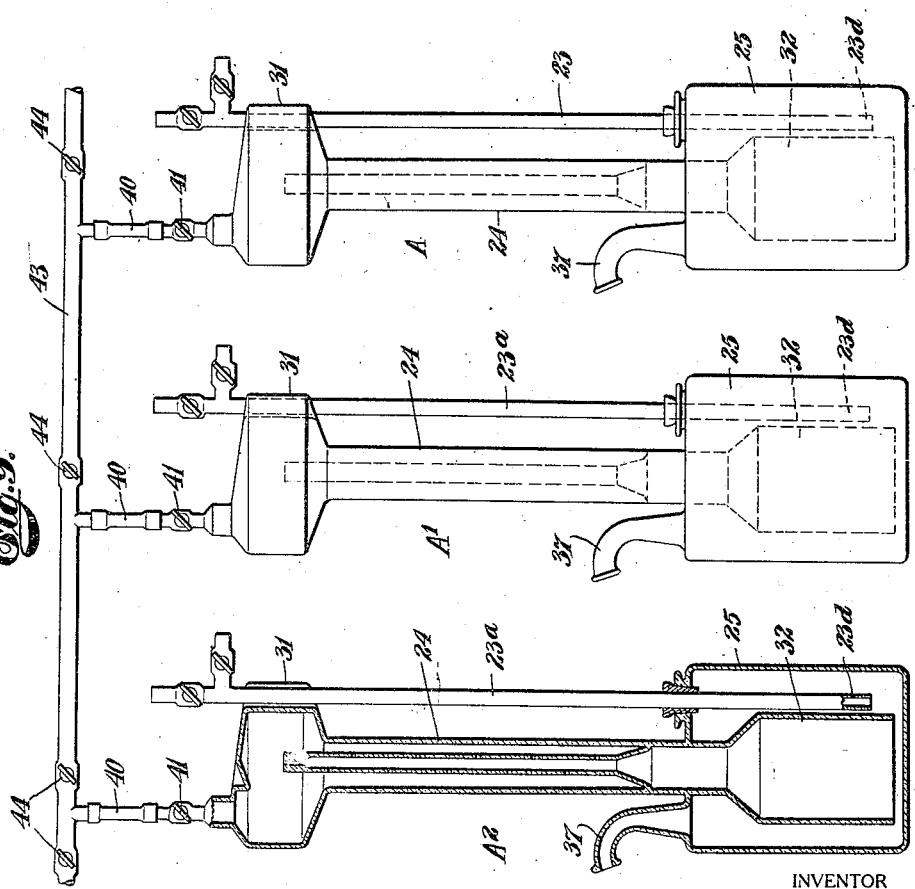
INVENTOR
Alexis S. Lomshakoff,
BY
Ramsay Hogue,
ATTORNEY Patented Dec. 2, 1924.

1,517,442

UNITED STATES PATENT OFFICE.

ALEXIS S. LOMSHAKOFF, OF PRAGUE, CZECHOSLOVAKIA.

GAS-ANALYZING APPARATUS.

Application filed December 12, 1923. Serial No. 680,099.

*To all whom it may concern:*

Be it known that I, ALEXIS S. LOMSHAKOFF, a citizen of Russia, and a resident of Prague, Czechoslovakia, have invented an Improvement in Gas-Analyzing Apparatus, of which the following is a specification.

My invention relates to improvements in gas analyzing apparatus which is adapted for analyzing flue gases and the like. The analyzing of gases of combustion for determining the amount of $CO_2$, $O_2$, CO, ($CH_4$ and heavy hydrocarbons) requires accuracy and speed. The object of my invention is to accomplish this result. My improved apparatus is of the type where the volume of gas to be found is determined by the decrease of the volume of sample gas as a result of absorption of its compounds by the corresponding absorbing solution coming in contact with the same. The closer the contact between the particles of gas and of its absorbing solution, and the greater the surface of the contact, the better and fuller is the absorption. It also depends on the circulation of the particles. My invention is intended to facilitate the above result.

In my apparatus, an accurately measured amount of sample gas, for instance one hundred cubic centimeters, is admitted into a container completely filled by a solution for absorbing its corresponding compounds. The gas moved in forces part of the solution from the first container into another one connected with same. The first part of the gas thus moved in precipitates into the second container. Both containers are connected by a tube representing two ways for passing the solution and the gas from one container to another. One way is through the open upper end which opens into the upper part of the solution container. The other way is through a number of small openings in the side surface of the same tube. The section area of these openings are selected so that they represent a greater resistance to the movement of the solution than the upper end of the tube. When the balance is offset, as for instance by a shock given to the mass of solution in the auxiliary container, part of the solution corresponding to the force of the shock is forced upwards through the connecting tube. The stream of solution then strikes against the walls of the container or against a specially formed surface, which breaks the solution into minute particles which fall down in the form of a fountain, coming by this action into contact with gas, washing it, and fully absorbing its corresponding compound. Then the solution passes into an auxiliary container, and during this period energetic mixing and refreshing of the solution takes place.

My present invention represents improved ways of carrying out the aforesaid principles, besides eliminating any possibility of the sprayed solution penetrating into the header through which the sample gas is being admitted to the container. All of which will be better understood from the description which follows.

Reference is to be had to the accompanying drawings forming a part of this specification, in which similar reference characters indicate corresponding parts in all the views.

Figure 1 is an elevation of an apparatus embodying my invention showing the receiver or internal container and two measuring burettes.

Figure 2 is a side elevation of one of the burettes.

Figure 3 is a vertical longitudinal section thereof.

Figure 4 is a plan view of one of the burettes.

Figure 5 is a sectional plan on the line 5—5 of Figure 3.

Figure 6 is a section on the line 6—6 of Figure 3.

Figure 7 shows another way of connecting one of the intake tubes with a burette.

Figure 8 is a vertical section of another form of measuring burette or container, and Figure 9 is an elevation with one of the burettes in section showing how the burettes can be connected to a common header in accordance with the usual practice.

The drawings are by way of example, as the design and some of the details may be varied without affecting the invention. As illustrated, I show a receiver 10 having graduated scale marks thereon as shown, which may be centimeters or otherwise, and the receiver is in the form of an elongated tube, preferably made of glass, or at least the part opposite the scale should be transparent. It is reduced at its lower end as shown at 11, and connected with an ordinary collapsible bulb 12 adapted to contain substantially the solution in the receiver, which solution may be a neutral solution, as the receiver is intended to measure the whole gas content to be analyzed. The receiver has preferably an enlarged upper portion 13, and has an intake tube 14 which is reduced at its lower end. This intake tube is preferably internal and extended downward to a point near the lower part of the receiver 10. The tube 14 connects with a tube 16 through which the flue or other gases to be measured may be admitted, and the inlet is controlled by the cock 17. The tube 14 also has a branch connection 18 opening to the air and controlled by a cock 19. I have shown the cocks 17 and 19 as a simple means of illustrating the fact that the gas inlet and air opening may be controlled, but if the pipes are flexible where they connect with the receiver or with the burettes hereinafter described, obviously the effect of a cock can be had by nipping and closing the flexible tube, as for instance with a clip shown at 9 on the pipe 38 in Figure 1.

The receiving burette 10 may be of any ordinary design, that shown being preferred. The bulb 12 should be capable of containing substantially the charge of liquid in the receiver 10, and before the gas is taken in, the liquid is forced up so as to fill the tube, and then the inflowing gas will automatically take the place of the solution which flows back into the bulb.

The receiver has a discharge outlet 20 at its upper end controlled by a cock 21, and an outlet for trapped air leading from the pipe 20 and controlled by a cock $18^1$. The outlet 20 connects by a pipe 22 which may be any suitable pipe connection, flexible or otherwise, with the inlet pipe 23 of the absorption burette A. I have shown this burette in connection with a similar burette $A^1$, and in practice any desired number of these burettes may be used, depending as will appear, on the various gases to be separated. The pipe 23 connects with a column 24 of the next measuring burette A, and this column can be conveniently of glass, and has an indicating scale thereon as shown. The pipe 23, as it contains the same solution and gas as the column 24, can also be provided with a scale as indicated, and the measurements can be read on either or both parts. The column 24 is preferably cylindrical and hollow, and it enters a receptacle 25 adapted to contain an absorbent solution for one of the gases, say $CO_2$, in which case the solution may be any of the well known absorbents for $CO_2$, as for instance potassium hydroxide, $KOH$. The receptacle 25 preferably has a flat bottom so that it may be conveniently stood upright, and it has a filling opening closed by a stopple 26. Obviously the receptacle 25 might be a rubber bulb, without affecting the invention.

The inlet pipe 23 can be exterior of the column 24, or it may be extended downward inside the column as shown at $23^a$ in Figure 7, or it might extend downward into the receptacle 25 exteriorly of the column 24, as shown at $23^b$ in Figure 8, and be curved up at its lower end to deliver into the enlarged part 32 of the column 24 as shown at $23^c$, or it might extend downward into the receptacle 25 to the lower part thereof, as shown at $23^d$ in Figure 9. In this last case the tube $23^d$ can be used only for equalizing the pressure but can not be used as a gas inlet pipe. The pipe 23 can have a cock 27 to control it, and may have an air vent pipe 28 controlled by the cock 29. The pipe 23 can either be entirely exterior of the apparatus, or extended downward through a part of it as described, or it may be held in a recess 30 in the mixing chamber 31 at the top of the column 24.

The lower end of the column 24 is preferably enlarged into a bell shape as shown at 32, and extends downward to a point near the bottom of the receptacle 25. Within the column 24 is a circulation tube 34 which at its lower end and near the lower part of the column 24, is spread as shown at $34^a$, and secured to the inner wall of the column 24, so as to effect a closure, and the body portion of the circulation tube 34 is relatively small, and has a reduced discharge upper end 33 which delivers into the mixing chamber 31 at the top of the column 24. The tube 34 is also perforated at intervals as shown at 35 to permit the gas and solution to pass through, and if desired these perforations may be graduated so as to be smaller at the bottom than at the top, and to offer more resistance to the passage of solution or gases at this point.

In the upper part of the receptacle 25 is a pipe or nipple 37 connecting by a tube 38 with a compressible bulb 39, and by means of this the solution in the receptacle 25 and in the rest of the burette, may be forced back and forth as presently described. The top of the mixing chamber 31 has an outlet pipe 40 controlled by the cock 41, and a tube $22^1$ connects this with the pipe 23 of the next burette $A^1$. Obviously the same connection can be made with a continuing series of measuring burettes. It will be noticed that the pipe 34 and the outlet pipe of the burette have their axes out of alignment, which is an improvement over the prior art. The circulation of solution and gas in the burette is complete, but the solution is not forced into the outlet pipe because of this offset arrangement.

In the mixing chamber 31 and above the discharge 33 of the circulation pipe 34, is a deflector 42 which prevents the solution squirted through the said opening 33 from rushing up into the outlet pipe 40, and which further acts to break up the discharge of the circulation pipe 34, so that the solution cascades around the walls of the mixing chamber and down into the column 24 in a spray, thus causing the gases and the absorbent solution to be thoroughly mixed mechanically, so that the best possible contact will be had, and the absorption will be completed in a very brief time.

It will be seen that by alternately pressing the bulb 39 and releasing the pressure, the solution may be made to surge back and forth, that is up and down in the burette to accomplish the foregoing result, and it will be understood too that other devices may be substituted for the bulbs herein referred to to give the desired impetus to the solution, as the necessary thing is to produce a shock or agitation which will break up the solution and bring it into intimate contact with the gases. As above noted, the bulb itself may be substituted for the receptacle 25.

It will be noted also that instead of connecting the several burettes shown in Figure 1, the pipes 40 or their equivalent, may be connected directly to a common header 43 (see Figure 9) having control cocks 44, after the manner already known, and by properly manipulating the several valves and bulbs, the gases may be passed from one burette to the other through the header 43.

It will be understood that the several burettes A, A$^1$, etc., will be charged with a solution adapted to absorb some gas. For instance, if the burette A is to be used to absorb and eliminate $CO_2$, it can be charged with potassium hydroxide, KOH, or equivalent absorbent, and if the burette A$^1$ is to absorb oxygen, it can be charged with a solution of pyrogallic acid. If a third burette A$^2$, as in Figure 9, is used, to absorb CO, it can be charged with an ammoniacal solution of copper chloride.

The apparatus can be used as follows. Before letting in the sample gas into the container 10, the solution is made to fill all the space in the container, and the inner tube 14, and any trapped air or gas can be let out through the cocks 18$^1$ and 18. This is accomplished by pressing the bulb 12. When the gas is being admitted, all the cocks are closed except the cock 17, which is opened, and the gas will follow the liquid down to the bulb 12. The cock 17 is then closed, and the bulb 12 pressed so as to bring the solution to the bottom of the tube 14, and before the liquid covers the end of the tube 14, the cock 18 is opened, allowing the excess gas to escape, and at the moment when the liquid covers the end of the tube 14 the volume of gas in the receiver 10 will be exactly say one hundred cubic centimeters, measured at atmospheric pressure. As soon as the liquid covers the end of the tube 14, cock 18 must be closed.

Referring to Figure 1, the cocks of the receiver 10 are all closed except 21, which is opened, the cocks 41 and 29 of the burette A being closed, and by pressing the bulb 12 so as to force the solution to the top of the receiver 10, the gas is expelled through the tube 22 and into the pipe 23 and column 24 of the measuring burette A. The cocks 27 and 41 of this burette are then closed, and the bulb 39 manipulated so as to force the absorbent solution in the receptacle 25 up and down through the apparatus, and the solution as it issues from the jet opening 33 will strike violently against the deflector 42, forming a spray, and causing the gas in the parts 31, 24, and 34 to mingle intimately with the sprayed solution, so that absorption will rapidly take place. The bulb 39 then may be manipulated so as to bring the solution to the bottom of the scale on the parts 23 or 24, the scale beginning above the opening of tube 23 into the column 24. The cock 29 then must be opened to equalize pressure and bulb manipulated until the solution in column 24 and tube 23 is on the same level, and a clip 9 may be snapped on the tube 38 to maintain this level. The amount of remaining gas can be read on the scale of the burette. If this scale indicates ninety centimeters, we will say, it will show that ten per cent of the original gas was $CO_2$, and has been absorbed.

The clip 9 may now be removed, the cocks 27 and 29 closed, the cock 41 opened, the cock 27 of the burette A$^1$ opened, and the cocks 29 and 41 of this burette closed, and by pressing the bulb 39 the liquid may be raised in the burette A, and the gas forced into the burette A$^1$, where the operation of washing, mixing, and absorbing may be carried on with the next gas precisely as already indicated, and thus the elimination process can be carried on through as many burettes as desired, according to the different gases that are to be absorbed.

If the apparatus is as shown in Figure 9, it functions the same, but there will be a slight difference in the manipulation of the valves. For instance, in forcing the gas from the burette A to the burette A$^1$, the cocks 41 of the burettes A and A$^1$ will be opened, and the cocks 44 manipulated so that the gas may be properly directed from one burette to the other. In this arrangement it will be seen that by selectively opening and closing the required cocks, and manipulating the desired bulbs, the gases may be forced from any burette into any other as desired, so that selective absorption can be carried on.

It will be understood from this appa-

It will be understood that from this apparatus that if a series of burettes are connected as described, after the first one or two burettes are relieved of their gases, they will naturally be shut off from the following burettes, and the treatment of a new volume of gas can begin, while the treatment of the original volume is being completed in the last burettes of the series.

It will be further understood that if desired the side pipes or tubes 23 can be omitted and connection made direct with the mixing chamber 31, and the parts will work satisfactorily, though the arrangement of the side tubes is preferred. It will also be understood that the cocks 41 and 27 can substantially be combined, and in fact this arrangement is practically shown in Figure 9.

I claim:—

1. An apparatus for analyzing gases comprising a measuring receiver having means for admitting gases and measuring of same at atmospheric pressure, a burette or absorption container connected to the receiver and having a mixing chamber, a receptacle to contain an absorbent solution, a graduated column connecting the receptacle and mixing chamber, and means for agitating the absorbent solution, and means for measuring of gases at atmospheric pressure and means for forcing gases from the receiver to the burette.

2. An apparatus for analyzing gases comprising a measuring receiver adapted to admit gases and to measure the same at atmospheric pressure, a series of absorption burettes arranged to discharge one to the other, each having a measuring column and means for agitating an absorbent solution therein, one of the burettes being connected to the receiver, and means for expelling gases from the receiver to the burettes and from one burette to the other.

3. An apparatus of the kind described comprising a measuring receiver having controlled inlets for gases and connection with atmospheric air and means for forcing liquid up and down therein, and a series of measuring burettes having controlled means for discharging gas from one to the other and each adapted to contain an absorbent solution, means bringing gases to the atmospheric pressure in each burette, means for mixing the contained gases and solution, means for measuring the unabsorbed gases in each burette at atmospheric pressure, means for forcing unabsorbed gases from one burette to the other, and a controlled connection between the receiver and one of the burettes.

4. A series of measuring burettes each having a receptacle for an absorbent solution, a mixing chamber, and a graduated column connecting the receptacle and mixing chamber, a controlled pipe connection between the mixing chamber of one burette and the column of the next, and means for expelling the unabsorbed gases from one burette to the next.

5. In an apparatus of the kind described, the receiver comprising a graduated liquid containing vessel having a gas inlet pipe extending into the lower part thereof, means for admitting air pressure to the vessel, a controlled outlet, and means for raising and lowering the liquid in the vessel.

6. In an apparatus of the kind described, the receiver comprising a graduated liquid containing vessel having a gas inlet pipe delivering into the lower part thereof, and an air connection, means for controlling the gas inlet and air connection, a gas outlet from the upper part thereof, and means at the lower end for forcing the solution up and down through the vessel.

7. In an apparatus of the kind described, the receiver comprising an elongated vessel with graduated measuring marks thereon, having a reduced lower end with means for circulating liquid connected thereto, a gas inlet and air connection pipe delivering into the lower part of the vessel, separate control for the gas and air, and a controlled gas outlet at the upper end.

8. In an apparatus of the kind described, the burette comprising a receptacle to contain liquid, a mixing chamber having a discharge for gas, a graduated column connecting the receptacle and mixing chamber, a circulation tube in the column discharging into the mixing chamber, means for forcing the solution through the circulation tube to the mixing chamber, means permitting the solution to run back into the receptacle, and means for admitting gases to the burette.

9. In an apparatus of the kind described, the burette comprising a liquid receptacle, a mixing chamber spaced apart from the receptacle, a graduated column connecting the mixing chamber and receptacle, means for admitting gas to the mixing chamber, a discharge for gas from the mixing chamber, and a perforated circulation tube arranged within the column and discharging into the mixing chamber.

10. In an apparatus of the kind described, the measuring burette comprising a liquid containing receptacle, a mixing chamber spaced apart from the receptacle, a graduated column connecting the receptacle and mixing chamber, a circulation pipe contained in the column and discharging into the mixing chamber, said circulation pipe having a closed connection with the inner wall of the column and having perforations therein, means for admitting gas to the column, and means connected with the receptacle for forcing solution through the column and circulation tube.

11. In an apparatus of the kind described, the measuring burette comprising a liquid containing receptacle, a mixing chamber having a gas outlet, a graduated column connecting the mixing chamber and receptacle, said column extending downward into the receptacle, a circulation tube within the column, said circulation tube effecting at its lower end a closure with the inner wall of the column, and having its upper end discharging into the mixing chamber, and a gas inlet delivering into the column above the connection between the column and the circulation tube.

12. In an apparatus of the kind described, the measuring burette comprising a liquid containing receptacle, a mixing chamber spaced apart from the receptacle, a graduated column connecting the receptacle and mixing chamber, a circulation tube arranged within the column and effecting a closure at its lower part with the inner wall of the column, and discharging at its upper end into the mixing chamber, a deflector in the mixing chamber above the discharge of the circulation tube, means for admitting gas to the upper part of the burette, and means for forcing the liquid back and forth through the burette.

13. An apparatus of the kind described comprising a measuring receiver to admit gas, a series of gas measuring burettes each adapted to contain an absorbent and each having a mixing chamber with a pipe connection to the next burette, means for forcing the gas from the receiver to one of the burettes, and means for forcing the absorbed gas from each burette to the next in series.

14. In an apparatus of the kind described, the burette comprising a receptacle to contain liquid, a mixing chamber having a discharge for gas, a graduated column connecting the receptacle and mixing chamber, a circulation tube in the column discharging into the mixing chamber, means for forcing the solution through the circulation tube to the mixing chamber, means permitting the solution to run back into the receptacle, means for admitting gases to the burette, and a discharge outlet, said outlet being out of alignment with the circulation tube.

15. The combination with the burette, the circulation tube arranged vertically therein, and the mixing chamber at the top of the column and arranged to receive the discharge of the mixing chamber, of means for circulating the liquid through the apparatus, and a discharge outlet from the mixing chamber offset with relation to the circulation tube.

16. An apparatus of the kind described comprising a series of measuring burettes, means for circulating solutions in each, and a pipe and cock connection between the several burettes whereby gases may be passed selectively from one to the other.

In testimony whereof, I have signed my name to this specification this 26th day of November, 1923.

ALEXIS S. LOMSHAKOFF.